United States Patent [19]
Pawlowski

[11] Patent Number: 5,960,453
[45] Date of Patent: *Sep. 28, 1999

[54] WORD SELECTION LOGIC TO IMPLEMENT AN 80 OR 96-BIT CACHE SRAM

[75] Inventor: Joseph Thomas Pawlowski, Boise, Id.

[73] Assignee: Micron Technology, Inc., Boise, Id.

[*] Notice: This patent is subject to a terminal disclaimer.

[21] Appl. No.: 08/663,386

[22] Filed: Jun. 13, 1996

[51] Int. Cl.$^6$ ............................ G06F 13/16; G06F 13/40; G06F 12/08
[52] U.S. Cl. .......................... 711/118; 395/307; 395/312; 395/309
[58] Field of Search ............................ 711/118; 395/854, 395/855, 307, 312, 309

[56] References Cited

U.S. PATENT DOCUMENTS

| | | | |
|---|---|---|---|
| 3,848,234 | 11/1974 | MacDonald | 711/119 |
| 4,084,234 | 4/1978 | Calle et al. | 711/118 |
| 4,386,402 | 5/1983 | Toy | 711/3 |
| 4,885,680 | 12/1989 | Anthony et al. | 711/144 |
| 5,015,883 | 5/1991 | Waller | 326/50 |
| 5,053,951 | 10/1991 | Nusinov et al. | 711/206 |
| 5,091,846 | 2/1992 | Sachs et al. | 711/130 |
| 5,091,850 | 2/1992 | Culley | 711/3 |
| 5,164,944 | 11/1992 | Benton et al. | 371/40.3 |
| 5,184,320 | 2/1993 | Dye | 365/49 |
| 5,220,215 | 6/1993 | Douglas et al. | 326/39 |
| 5,228,134 | 7/1993 | MacWilliams et al. | 711/138 |
| 5,235,221 | 8/1993 | Douglas et al. | 326/38 |
| 5,280,598 | 1/1994 | Osaki et al. | 395/307 |
| 5,287,017 | 2/1994 | Narasimhan et al. | 326/37 |
| 5,293,603 | 3/1994 | MacWilliams et al. | 395/309 |
| 5,298,803 | 3/1994 | Starkweather | 326/37 |
| 5,300,830 | 4/1994 | Hawes | 326/41 |
| 5,361,238 | 11/1994 | Owechko | 365/234 |
| 5,394,528 | 2/1995 | Kobayashi et al. | 395/307 |
| 5,406,525 | 4/1995 | Nicholes | 365/230.02 |
| 5,423,016 | 6/1995 | Tsuchiya et al. | 711/123 |
| 5,432,804 | 7/1995 | Diamondstein et al. | 371/43.7 |
| 5,469,555 | 11/1995 | Ghosh et al. | 711/133 |
| 5,553,259 | 9/1996 | Kalish et al. | 711/3 |
| 5,553,263 | 9/1996 | Kalish et al. | 711/127 |
| 5,559,986 | 9/1996 | Alpert et al. | 711/144 |
| 5,581,734 | 12/1996 | DiBrino et al. | 711/169 |
| 5,586,303 | 12/1996 | Willenz et al. | 711/172 |
| 5,590,352 | 12/1996 | Zuraski et al. | 395/800.23 |
| 5,603,041 | 2/1997 | Carpenter et al. | 395/855 |
| 5,627,963 | 5/1997 | Gabillard et al. | 395/183.18 |

FOREIGN PATENT DOCUMENTS

97/48048  12/1997  WIPO .

OTHER PUBLICATIONS

Pentium Processor User's Manual vol. 1: Pentium Processor Data Book; Intel Corporation, 1994; pp. 6–13 to 6–17. Dec. 1994.

Pentium Processor User's Manual vol. 2: 824191 Cache SRAM Data Book; Intel Corporation, 1994; pp. 1–13 to 1–20, 4–1, 4–5 to 4–7, 4–9, 5–28 to 5–30. Dec. 1994.

"Fast TTL Burst controller for Microprocessor", *IBM Technical disclosure Bulletin,* vol. 33, No. 8, pp. 118–120, (Jan. 1991).

*Primary Examiner*—Reginald G. Bragdon
*Attorney, Agent, or Firm*—Schwegman, Lundberg, Woessner & Kluth, P.A.

[57] ABSTRACT

A logic which enables implementation of a 80-bit wide or a 96-bit wide cache SRAM using the same memory array. The logic implementation is accomplished by merging tag, and data into an order block of information to maximize bus utilization. The logic reduces the bus cycles from four cycles for an 80-bit to three cycles for a 96-bit implementation.

24 Claims, 11 Drawing Sheets

| INITIAL ADDRESS 00 | OB6 | OB5 | OB4 | OB3 | OB2 | OB1 |
|---|---|---|---|---|---|---|
| CYCLE1 | 1.4 | 1.3 | 1.2 | 1.1 | TAG.2 | TAG.1 |
| CYCLE2 | 2.4 | 2.3 | 2.2 | 2.1 | 4.2 | 4.1 |
| CYCLE3 | 3.4 | 3.3 | 3.2 | 3.1 | 4.4 | 4.3 |

INITIAL ADDRESS 00

| | OB6 | OB5 | OB4 | OB3 | OB2 | OB1 |
|---|---|---|---|---|---|---|
| CYCLE1 | 1.4 | 1.3 | 1.2 | 1.1 | TAG.2 | TAG.1 |
| CYCLE2 | 2.4 | 2.3 | 2.2 | 2.1 | 4.2 | 4.1 |
| CYCLE3 | 3.4 | 3.3 | 3.2 | 3.1 | 4.4 | 4.3 |

FIG. 4A

INITIAL ADDRESS 01

| | OB6 | OB5 | OB4 | OB3 | OB2 | OB1 |
|---|---|---|---|---|---|---|
| CYCLE1 | 2.4 | 2.3 | 2.2 | 2.1 | TAG.2 | TAG.1 |
| CYCLE2 | 3.4 | 3.3 | 3.2 | 3.1 | 1.2 | 1.1 |
| CYCLE3 | 4.4 | 4.3 | 4.2 | 4.1 | 1.4 | 1.3 |

FIG. 4B

INITIAL ADDRESS 10

| | OB6 | OB5 | OB4 | OB3 | OB2 | OB1 |
|---|---|---|---|---|---|---|
| CYCLE1 | 3.4 | 3.3 | 3.2 | 3.1 | TAG.2 | TAG.1 |
| CYCLE2 | 4.4 | 4.3 | 4.2 | 4.1 | 2.2 | 2.1 |
| CYCLE3 | 1.4 | 1.3 | 1.2 | 1.1 | 2.4 | 2.3 |

FIG. 4C

INITIAL ADDRESS 11

| | OB6 | OB5 | OB4 | OB3 | OB2 | OB1 |
|---|---|---|---|---|---|---|
| CYCLE1 | 4.4 | 4.3 | 4.2 | 4.1 | TAG.2 | TAG.1 |
| CYCLE2 | 1.4 | 1.3 | 1.2 | 1.1 | 3.2 | 3.1 |
| CYCLE3 | 2.4 | 2.3 | 2.2 | 2.1 | 3.4 | 3.3 |

FIG. 4D

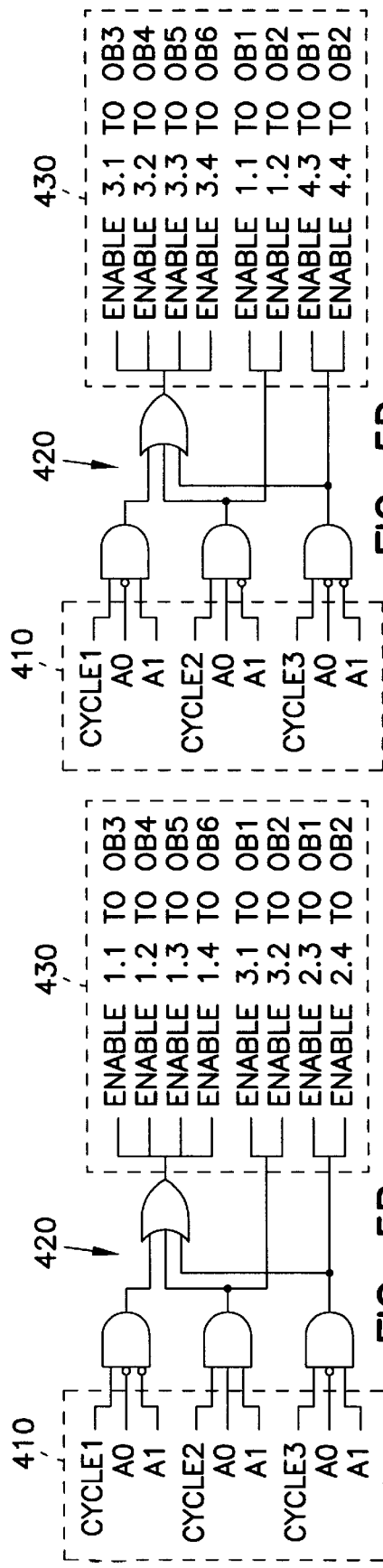
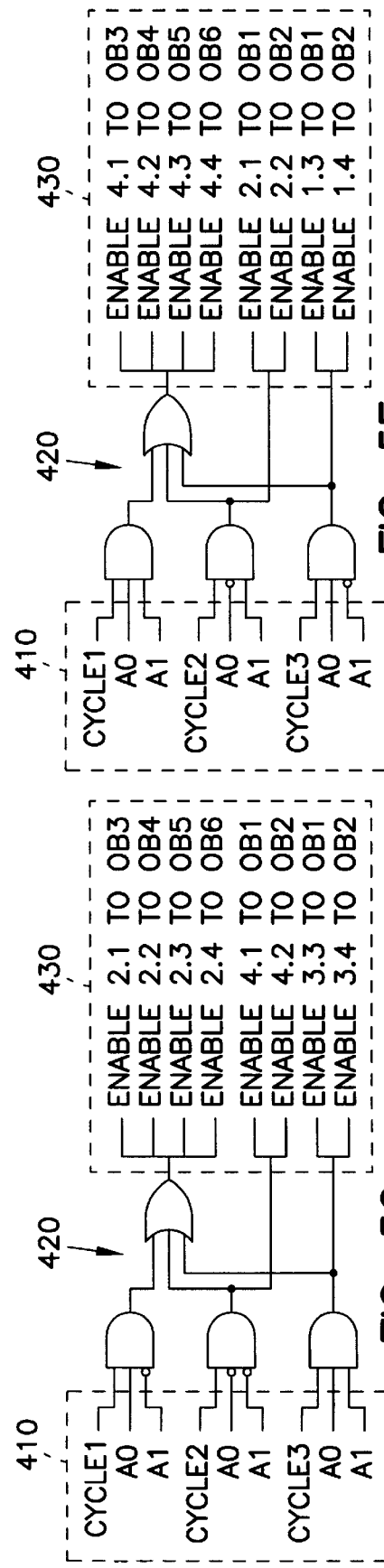

| INITIAL ADDRESS 00 | OB6 | OB5 | OB4 | OB3 | OB1 |
|---|---|---|---|---|---|
| CYCLE1 | 1.4 | 1.3 | 1.2 | 1.1 | TAG.1 |
| CYCLE2 | 2.4 | 2.3 | 2.2 | 2.1 | TAG.2 |
| CYCLE3 | 3.4 | 3.3 | 3.2 | 3.1 | TAG.3 |
| CYCLE4 | 4.4 | 4.3 | 4.2 | 4.1 | TAG.4 |

FIG. 7A

| INITIAL ADDRESS 01 | OB6 | OB5 | OB4 | OB3 | OB1 |
|---|---|---|---|---|---|
| CYCLE1 | 2.4 | 2.3 | 2.2 | 2.1 | TAG.1 |
| CYCLE2 | 3.4 | 3.3 | 3.2 | 3.1 | TAG.2 |
| CYCLE3 | 4.4 | 4.3 | 4.2 | 4.1 | TAG.3 |
| CYCLE4 | 1.4 | 1.3 | 1.2 | 1.1 | TAG.4 |

FIG. 7B

| INITIAL ADDRESS 10 | OB6 | OB5 | OB4 | OB3 | OB1 |
|---|---|---|---|---|---|
| CYCLE1 | 3.4 | 3.3 | 3.2 | 3.1 | TAG.1 |
| CYCLE2 | 4.4 | 4.3 | 4.2 | 4.1 | TAG.2 |
| CYCLE3 | 1.4 | 1.3 | 1.2 | 1.1 | TAG.3 |
| CYCLE4 | 2.4 | 2.3 | 2.2 | 2.1 | TAG.4 |

FIG. 7C

| INITIAL ADDRESS 11 | OB6 | OB5 | OB4 | OB3 | OB1 |
|---|---|---|---|---|---|
| CYCLE1 | 4.4 | 4.3 | 4.2 | 4.1 | TAG.1 |
| CYCLE2 | 1.4 | 1.3 | 1.2 | 1.1 | TAG.2 |
| CYCLE3 | 2.4 | 2.3 | 2.2 | 2.1 | TAG.3 |
| CYCLE4 | 3.4 | 3.3 | 3.2 | 3.1 | TAG.4 |

FIG. 7D

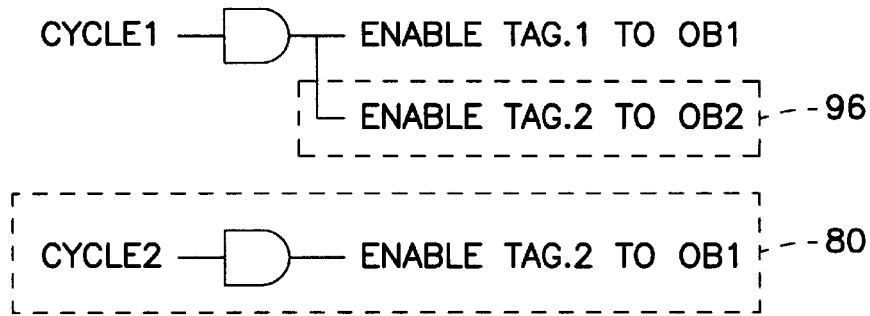
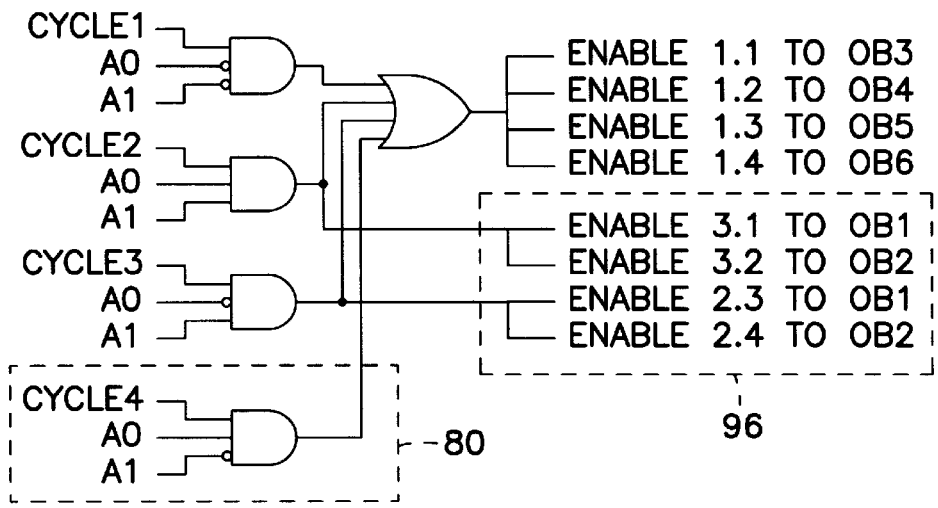
FIG. 9B
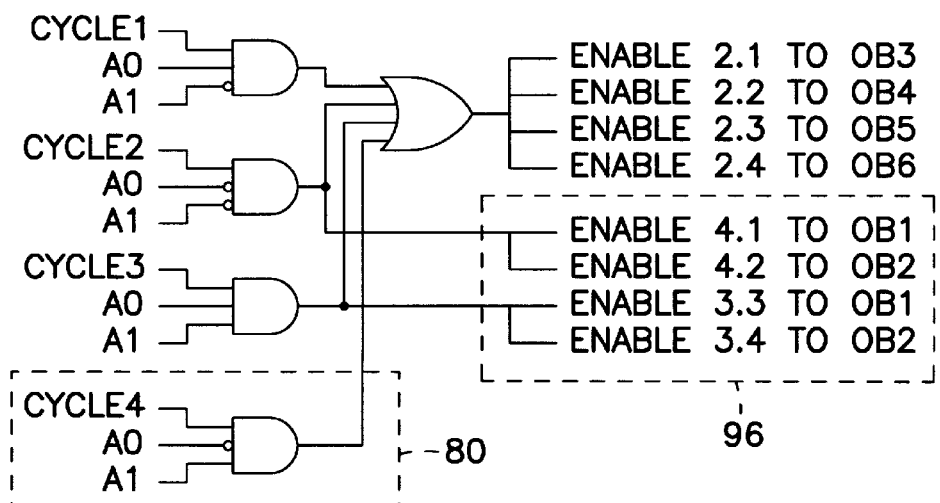
FIG. 9C

WORD SELECTION LOGIC TO IMPLEMENT AN 80 OR 96-BIT CACHE SRAM

FIELD OF THE INVENTION

The present invention relates to digital computers in general, and to computer memory in particular. More particular still, this invention relates to logic implementation of cache memory.

BACKGROUND OF THE INVENTION

The performance of computer systems, especially personal computers, has improved dramatically due to the rapid growth in computer architecture design and in particular to the performance of computer memory.

Computer processors and memories however have not pursued the same pace of development through the years. Memories are not able to deliver enough response speed to processors. To reduce the gap in speed between the processors and memories, the concept of memory hierarchy was introduced. A memory hierarchy comprises a number of different memory levels, sizes and speeds. The memory located near or inside the processor is usually the smallest and fastest and is commonly referred to as cache memory. Cache memory needs to be fast to accommodate the demand of the processor therefore it is usually constructed from static-type memory or static random access memory (SRAM).

Cache memory plays an important role in the computer memory hierarchy. Computer instructions and data which are most likely to be reused are stored temporarily in the cache memory because the processor can access these instructions or data much faster than accessing them from the slower computer main memory.

Almost all of cache memories are managed by hardware meaning that the cache operation is physically controlled by logic circuits. Implementation of cache memory is not the same in different type of processors since the logic control circuits are different. In some implementations, a processor-cache interface uses a 64-bit bus data and an additional bus for tag. The tag bus width varies, but has nominally been 16 bits for a total of 80 bits wide for tag plus data. If the cache block (or cache line) size is four times the data bus width, then no useful information appears on the tag bus for three out of every four bus cycles therefore the bus is not utilized efficiently.

There is a need for a logic to implement a cache SRAM so that the utilization of data and tag bus can be more efficient. This logic could implement a 64-bit data bus plus a 16-bit or more tag bus but the same logic is also usable to implement a 96-bit bus.

SUMMARY OF THE INVENTION

The present invention describes a selection logic which enables the implementation of an 80-bit wide or a 96-bit wide SRAM in a computer system comprising a microprocessor and a cache memory. In one embodiment, the logic enables the implementation of an 80-bit or a 96-bit wide cache SRAM. This logic could also be used to implement two SRAMs having half the width, that is two 40-bit or 48-bit cache SRAMs. The present invention permits higher useful data throughput on an 80 or a 96-bit bus than what has been previously achieved with an 80-bit bus. This logic implementation is accomplished by merging tag, error checking and correction (ECC), and data into an ordered block of information to maximize bus utilization.

The important advantages of this logic implementation is that it utilizes useful information on every bus cycle for an 80-bit bus case and it reduces the number of bus cycles from four to three in the case of a 96-bit bus.

BRIEF DESCRIPTION OF THE DRAWINGS

FIGS. 4A–4D are possible output block selection combinations when the initial address is 00, 01, 10, and 11 respectively for the case of a 96-bit implementation.

FIGS. 5A–5E are the combinations of the logic for the case of a 96-bit implementation according to the present invention.

FIGS. 7A–7D are possible output block selection combinations for the case of an 80-bit implementation.

FIGS. 9A–9E are the combinations of the logic for both cases of an 80-bit and a 96-bit implementation according to the present invention.

DESCRIPTION OF THE PREFERRED EMBODIMENT

In the following detailed description of the preferred embodiment, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in limiting sense, and the scope of the invention is defined by the appended claims.

Figure 1:
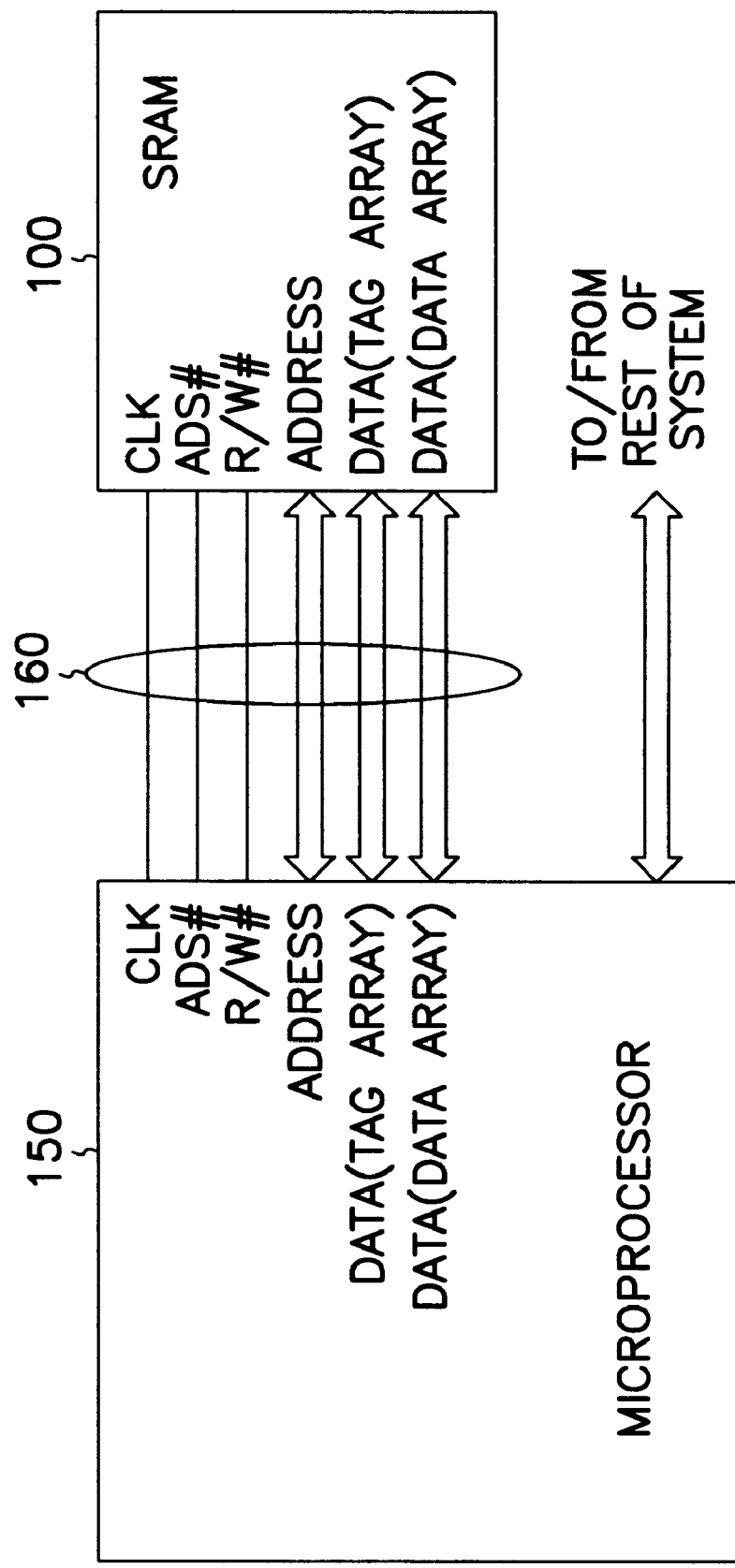
FIG. 1 is a block diagram of a simplified computer system comprising a microprocessor and an 80-bit or a 96-bit cache SRAM.

FIG. 1 illustrates a simplified computer system comprising a microprocessor 150 connected to an 80-/96-bit cache SRAM 100 through a processor-cache interface 160. Processor-cache interface 160 comprises a system clock (CLK), an address data strobe (ADS#), a read or write request (RW#), an address bus, a tag bus and a data bus.

Figure 2:
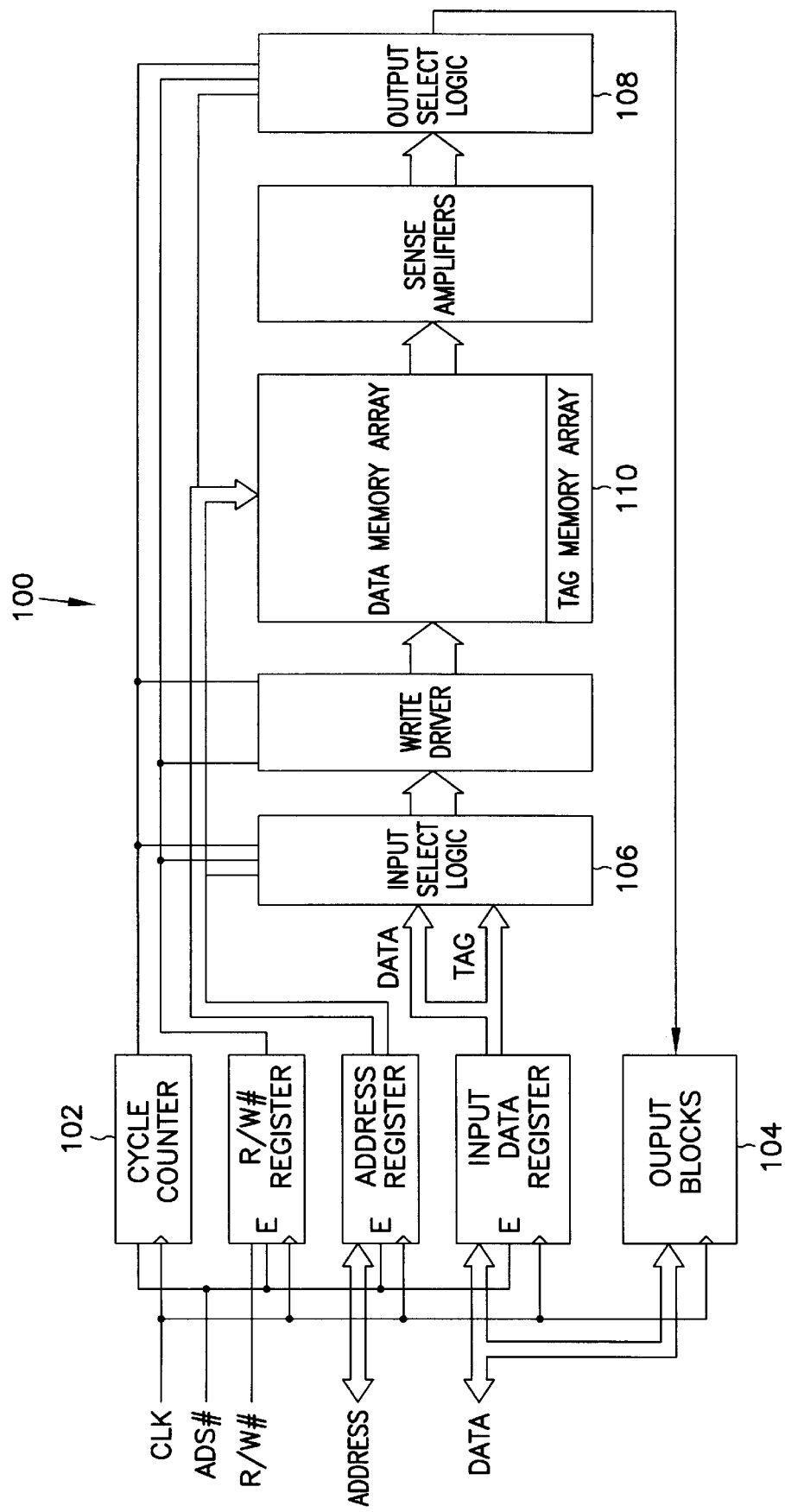
FIG. 2 is a block diagram of the 80-/96-bit cache SRAM of FIG. 1.

FIG. 2 is block diagram of the 80-/96-bit cache SRAM 100 of FIG. 1. Cache SRAM 100 can support an 80 to 96 bit data bus. The 80-bit or 96-bit operations are accomplished by a data ordering scheme and logic selections of input select logic 106 and output select logic 108. Input and output logic 106 and 108 are logically identical. Data are transferred to and from a data and tag memory array 110 in three bus cycles in the case of an 96-bit system and in four bus cycles in the case of a 80-bit system. The sequence of the bus cycles is monitored by a bus cycle counter 102. Cycle counter 102 begins when ADS# is low and resets to zero and holds after three counts (cycle1, cycle2 then cycle3 for a 96-bit system), or after four counts (cycle1, cycle2, cycle3 then cycle4 for an 80-bit system). Data is written to or is read from memory array 110 by a write operation or read operation respectively. In the diagram, RW# indicates whether a read or write operation is requested, the sign # indicating that it writes if the signal is low. Address represents the sought memory location in memory array 110. Data represents a composite collection of data and tag bits.

Figure 3:
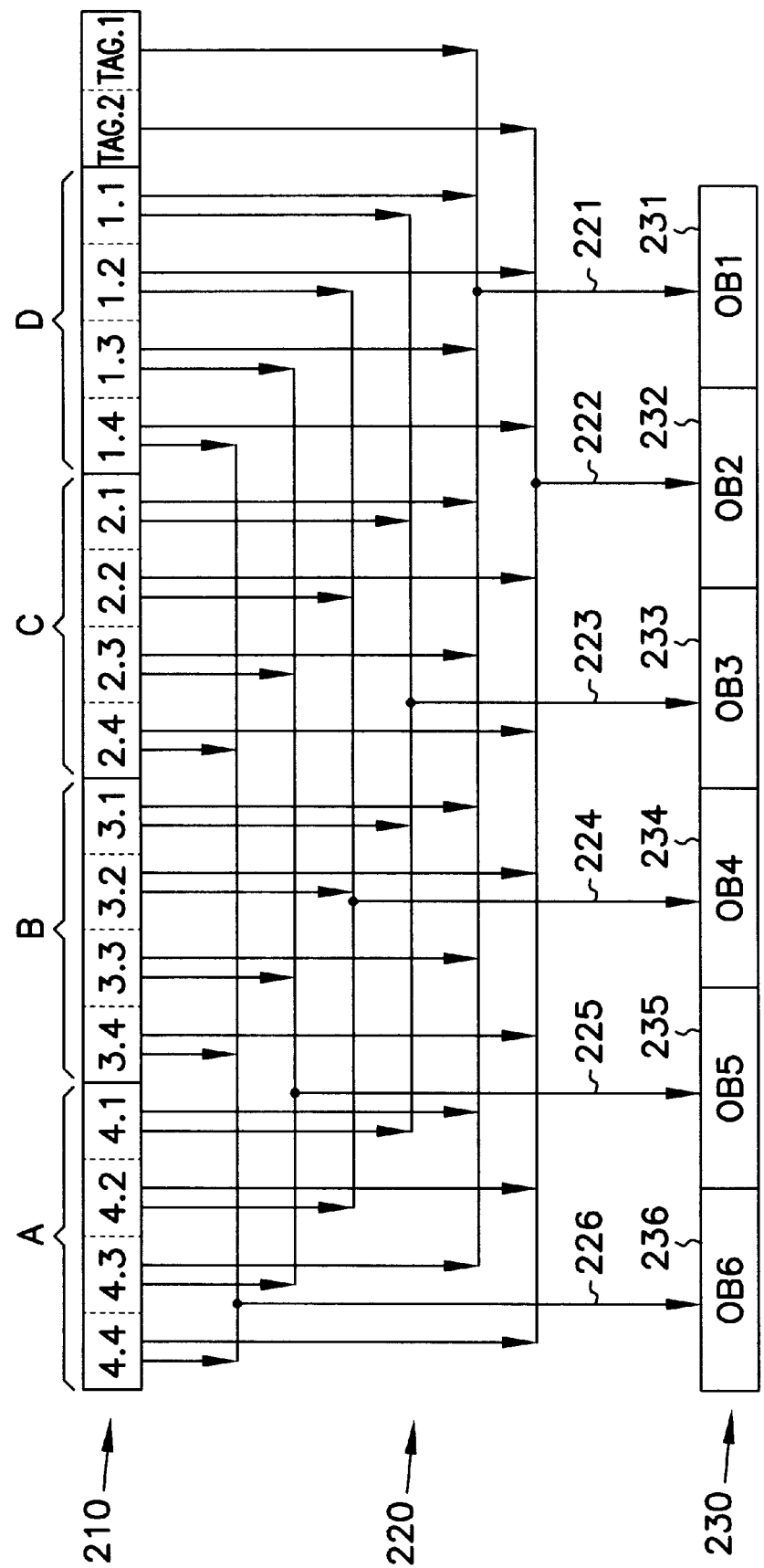
FIG. 3 is a block diagram of available routes for data transfer from the memory array to the output blocks for the case of a 96-bit implementation.

FIG. 3 is a block diagram of available routes for data to be transferred from the memory array to the output blocks for the case of a 96-bit implementation. This embodiment shows a portion of memory array 210 which comprises four 64-bit longwords A, B, C and D and two tag words totaling up to 32 bits and are indicated as tag.1 and tag.2. Tag in this and in other embodiments represents additional information such as status, ECC, tag, etc. Each of the four 64-bit longwords is divided into four 16-bit words. Longword A has four 16-bit words indicated as 4.4, 4.3, 4.2 and 4.1. Longword B has four 16-bit words indicated as 3.4, 3.3, 3.2 and 3.1. Longword C has four 16-bit words indicated as 2.4, 2.3, 2.2 and 2.1 and longword D has four 16-bit words indicated as 1.4, 1.3, 1.2 and 1.1. In this embodiments, 1.1 represents datum 1; word 1, 1.2 represents datum 1 word 2, 1.3 represents datum 1; word 3, and etc.

Words A, B, C and D, in that order, represent the order of data criticality to the processor. The actual physical address which is considered critically ordered differs from processor to processor in existing implementations and may entail a modula-4 linear burst, a modula-4 interleaved order, etc. For the typical line addressing microprocessor (e.g. PowerPC or Cyrix M1), the optimal order is modula-4 linear burst. This ordering is shown in Table A. Any other ordering for this type of processor will prevent maximization of performance for a processor designed to utilize the 96-bit operation. The reason for this is that, in the course of operating on a whole block of data, the highest probability of utilizing data in the block is 100% for the initial address, and less for each subsequent address. The probability is much lower for the previous address. Therefore, if the initial address is 01, the address before it, namely 00, is probably the least necessary to have and should therefore have less priority. Hence, A, D, C, and D would show the following sequence represented in binary form in which x stands for "any":

TABLE A

Linear Burst Data Ordering in a Four Entry Cache Line

| Initial address | A | B | C | D |
|---|---|---|---|---|
| x00 | x00 | x01 | x10 | x11 |
| x01 | x01 | x10 | x11 | x00 |
| x10 | x10 | x11 | x00 | x01 |
| x11 | x11 | x00 | x01 | x10 |

For processors which required interleaved burst order (e.g. Intel Pentium), a modula-4 interleaved burst order could be used. This ordering is shown in Table B.

TABLE B

Interleaved Burst Data Ordering in a Four Entry Cache Line

| Initial address | A | B | C | D |
|---|---|---|---|---|
| x00 | x00 | x01 | x10 | x11 |
| x01 | x01 | x00 | x11 | x10 |
| x10 | x10 | x11 | x00 | x01 |
| x11 | x11 | x10 | x01 | x00 |

In one embodiment, the order in which the cache line data words are transferred is programmable. Such a device would permit, for example, both interleaved and linear burst data ordering with the same cache device. In another embodiment, data ordering could be changed to reflect characteristics of the programs or programs being executed (e.g. a program operating at particular stride through memory).

Referring again to FIG. 3, data are transferred from memory array 210 to output blocks 230 by a logic selection from a plurality of pathways 220. Pathways 220 comprises thirty-four routes in which six routes 221 through 226 are connected to the output blocks 230 at each 16-bit output blocks 231 through 236 indicated respectively as OB1 to OB6. An output block is comprised of output buffers and optionally data registers or latches. The logic which enables six of these thirty-four available routes will be described below.

FIGS. 4A–4D are possible output block selection combinations when the initial address is 00, 01, 10, and 11 respectively for the case of a 96-bit implementation. These Figures clearly shows that a 96-bit bus can be implemented using only three bus cycles. Tag only appears in the first bus cycle (cycle1), freeing the input/output lines for data transfer during cycle two (cycle2) and cycle three (cycle3). This ordering simplies the logic needed to transfer the cache line data words and reduces the number of paths that must be available. The logic which enables these possible output block selection combinations is described in FIGS. 5A–5E.

FIGS. 5A–5E are the combinations of the logic for the case of a 96-bit implementation. For this 96-bit case, only three bus cycles are needed and the order of data transaction is cycle1, then cycle2, and finally cycle3. In this embodiment, the logic comprises a combination of input 410, logic gates 420 and a plurality of outputs 430. Logic gates 420 comprises a plurality of logic AND and logic OR gates. Input 410 driving the logic comprises cycle1, cycle2, cycle3, A0 and A1. A0 and A1 represent the two least significant bits of the initial address. Cycle1, cycle2 or cycle3 is the current bus cycle determined by bus cycle counter 102. Outputs 430 from this logic enables the data to be transferred to the appropriate blocks OB1 through OB6 of output blocks 230. Detailed combinations of the logic enabling at output 430 are described in Table 1. In this table, OB represents output block, IA represents the least two significant bits of the initial address, tag.1 and tag.2 represent the miscellaneous additional information such as status, ECC, tag, etc. and 1.1 represents datum 1: word 1 in the current cache line, 1.2 represents datum 1; word 2, etc.

TABLE 1

Logic for a 96-bit Linear Burst Data Ordering Implementation

Enable tag.1 to OB1 = Cycle1
Enable tag.2 to OB2 = Cycle1
Enable 1.1 to OB3 = Cycle1 AND (IA = 00) OR Cycle2 AND (IA = 11) OR Cycle3 AND (IA = 10)
Enable 1.2 to OB4 = Cycle1 AND (1A = 00) OR Cycle2 AND (1A = 11) OR Cycle3 AND (IA = 10)
Enable 1.3 to OB5 = Cycle1 AND (IA = 00) OR Cycle2 AND (IA = 11) OR Cycle3 AND (IA = 10)
Enable 1.4 to OB6 = Cycle1 AND (IA = 00) OR Cycle2 AND (IA = 11) OR Cycle3 AND (IA = 10)
Enable 1.1 to OB1 = Cycle2 AND (IA = 01)
Enable 1.2 to OB2 = Cycle2 AND (IA = 01)
Enable 1.3 to OB1 = Cycle3 AND (IA = 01)
Enable 1.4 to OB2 = Cycle3 AND (IA = 01)
Enable 2.1 to OB3 = Cycle1 AND (IA = 01) OR Cycle2 AND (IA = 00) OR Cycle3 AND (IA = 11)
Enable 2.2 to OB4 = Cycle1 AND (IA = 01) OR Cycle2 AND (IA = 00)

TABLE 1-continued

Logic for a 96-bit Linear Burst Data Ordering Implementation

OR Cycle3 AND (IA = 11)
Enable 2.3 to OB5 = Cycle1 AND (IA = 01) OR Cycle2 AND (IA = 00)
OR Cycle3 AND (IA = 11)
Enable 2.4 to OB6 = Cycle1 AND (IA = 01) OR Cycle2 AND (IA = 00)
OR Cycle3 AND (IA = 11)
Enable 2.1 to OB1 = Cycle2 AND (IA = 10)
Enable 2.2 to OB2 = Cycle2 AND (IA = 10)
Enable 2.3 to OB1 = Cycle3 AND (IA = 10)
Enable 2.4 to OB2 = Cycle3 AND (IA = 10)
Enable 3.1 to OB3 = Cycle1 AND (IA = 10) OR Cycle2 AND (IA = 01)
OR Cycle3 AND (IA = 00)
Enable 3.2 to OB4 = Cycle1 AND (IA = 10) OR Cycle2 AND (IA = 01)
OR Cycle3 AND (IA = 00)
Enable 3.3 to OB5 = Cycle1 AND (IA = 10) OR Cycle2 AND (IA = 01)
OR Cycle3 AND (IA = 00)
Enable 3.4 to OB6 = Cycle1 AND (IA = 10) OR Cycle2 AND (IA = 01)
OR Cycle3 AND (IA = 00)
Enable 3.1 to OB1 = Cycle2 AND (IA = 11)
Enable 3.2 to OB2 = Cycle2 AND (IA = 11)
Enable 3.3 to OB1 = Cycle3 AND (IA = 11)
Enable 3.4 to OB2 = Cycle3 AND (IA = 11)
Enable 4.1 to OB3 = Cycle1 AND (IA = 11) OR Cycle2 AND (IA = 10)
OR Cycle3 AND (IA = 01)
Enable 4.2 to OB4 = Cycle1 AND (IA = 11) OR Cycle2 AND (IA = 10)
OR Cycle3 AND (IA = 01)
Enable 4.3 to OB5 = Cycle1 AND (IA = 11) OR Cycle2 AND (IA = 10)
OR Cycle3 AND (IA = 01)
Enable 4.4 to OB6 = Cycle1 AND (IA = 11) OR Cycle2 AND (IA = 10)
OR Cycle3 AND (IA = 01)
Enable 4.1 to OB1 = Cycle2 AND (IA = 00)
Enable 4.2 to OB2 = Cycle2 AND (IA = 00)
Enable 4.3 to OB1 = Cycle3 AND (IA = 00)
Enable 4.4 to OB2 = Cycle3 AND (IA = 00)

Those skilled in the art will readily recognize that the above description for a 96-bit bus implementation could also be used to implement a 96-bit wide device using two 48-bit wide devices. The 96-bit implementation for the two 48-bit wide devices would be implemented as such: all the even words are in one device, and all the odd words are in the other device. For example, words 1.4, 2.4, 3,4, 4.4, 1.2, 2.2, 3.2, 4.2 (x.4, x.2), OB6, OB4, OB2 are in one device, and x.3, x.1, OB5, OB3, OB1 are in the other device. The described logic operates exactly as explained and the devices operate together seamlessly, and only one design is necessary; two identical devices are used in the implementation.

Figure 6:
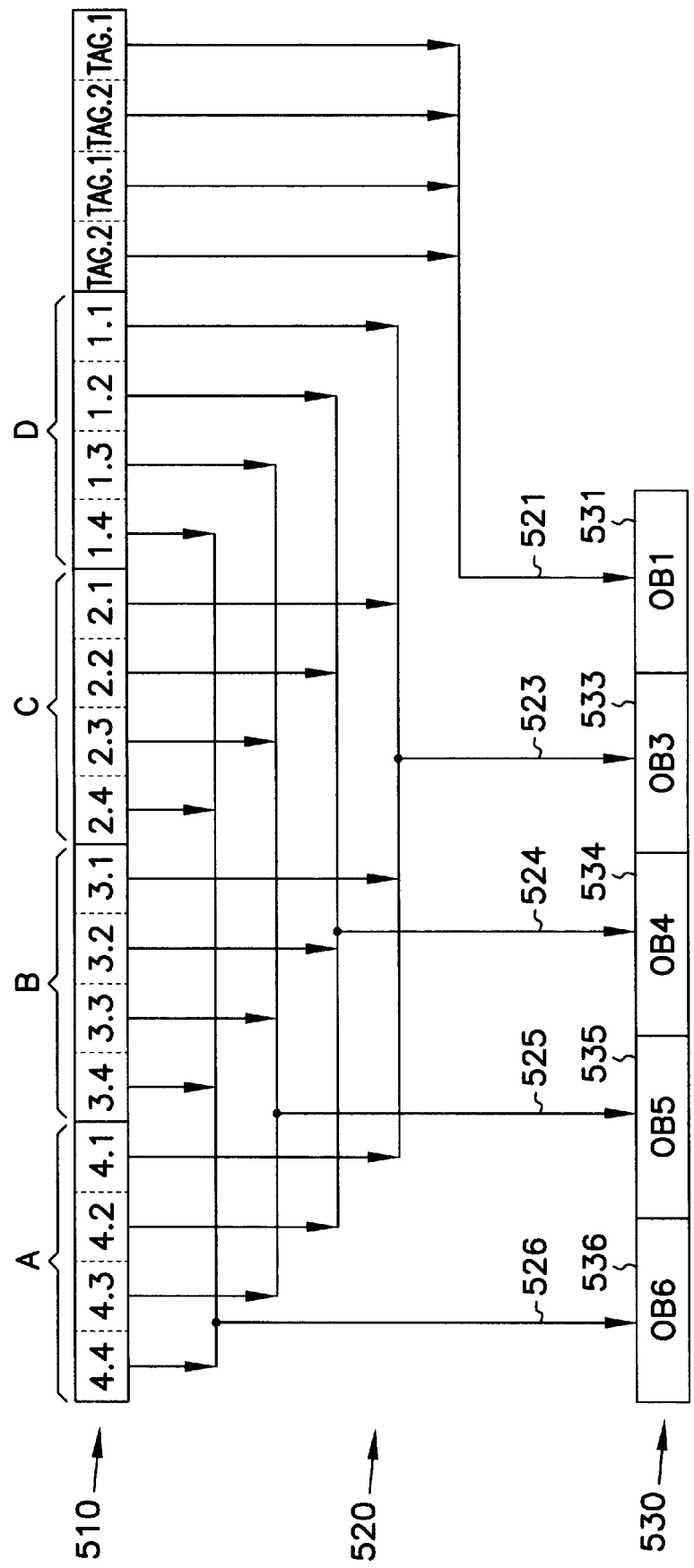
FIG. 6 is a block diagram of available routes for data transfer from the memory array to the output blocks for the case of an 80-bit implementation.
Figure 8A:
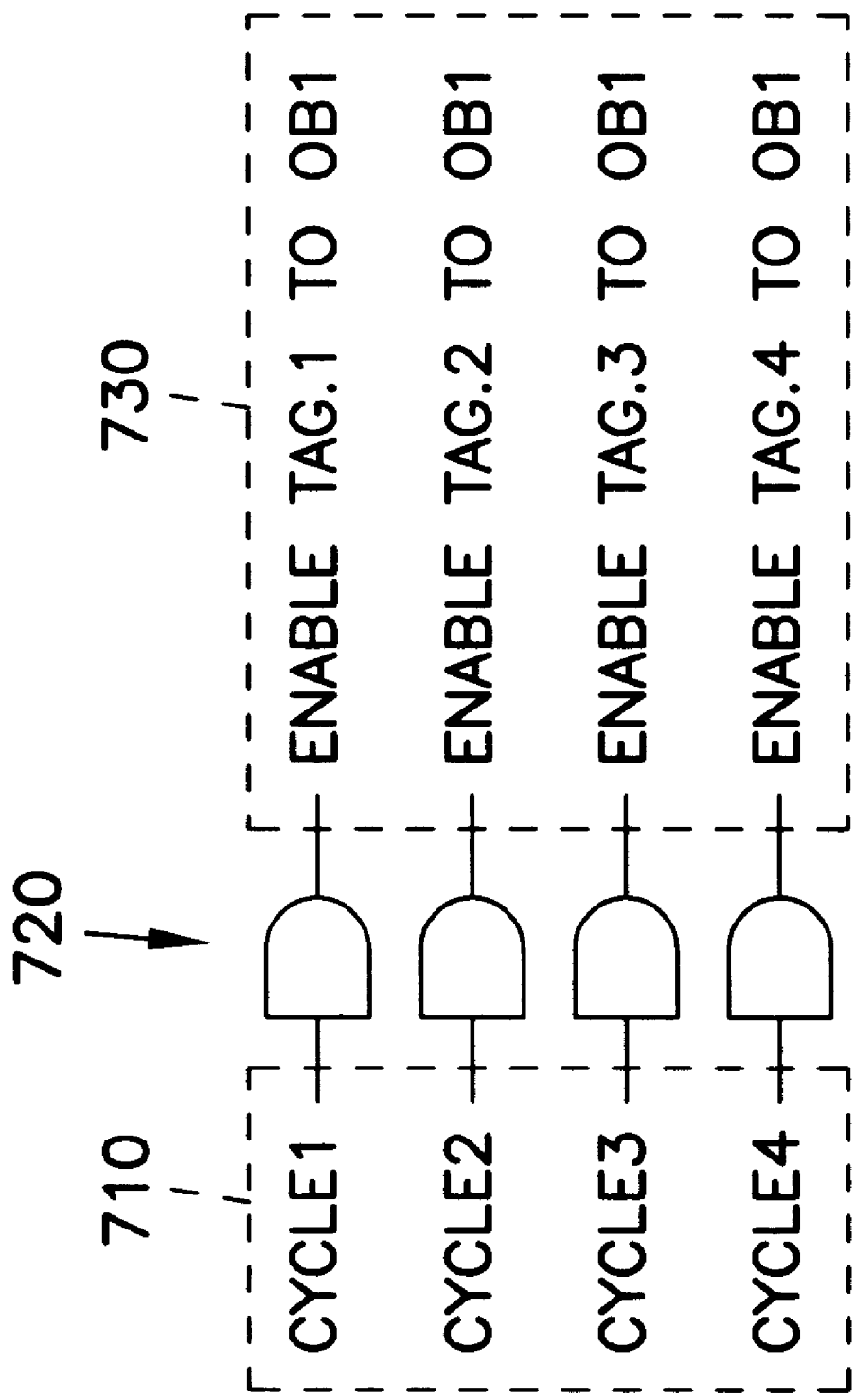
FIGS. 8A–8E are the combinations of the logic for the case of an 80-bit implementation according to the present invention.
Figure 8B:
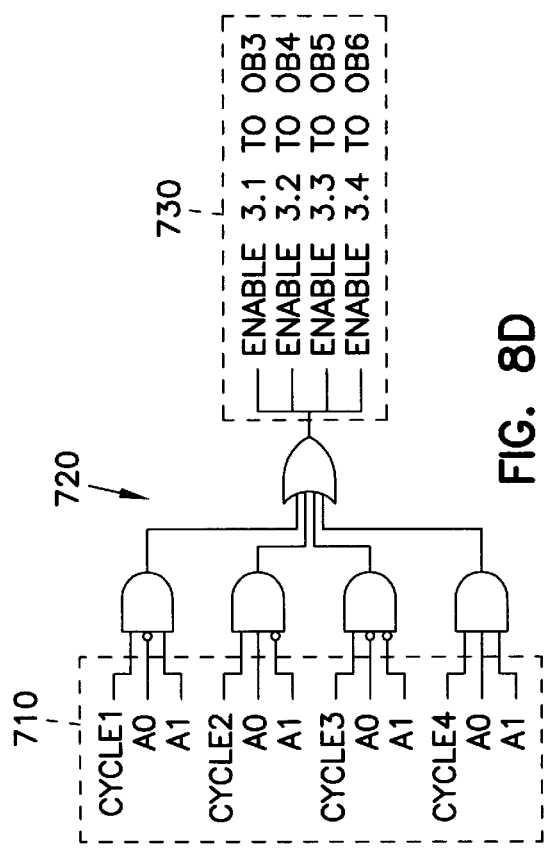
Figure 8D:
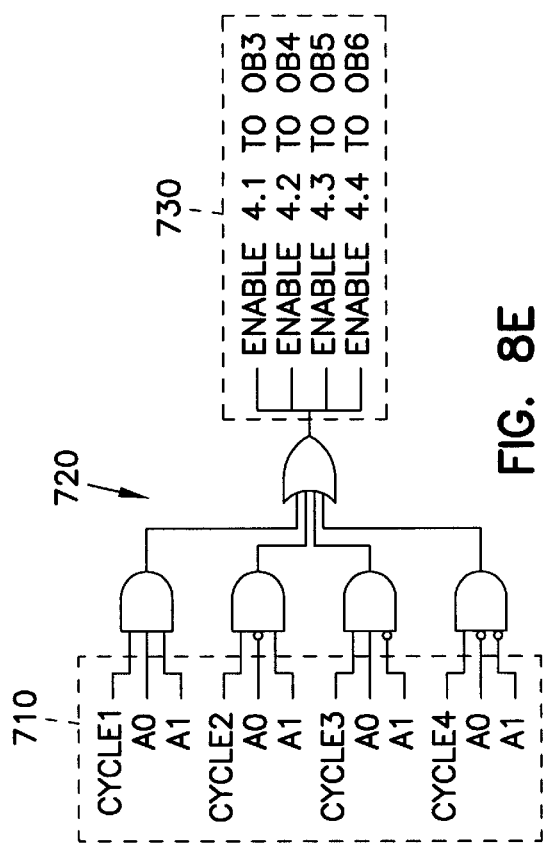
Figure 8C:
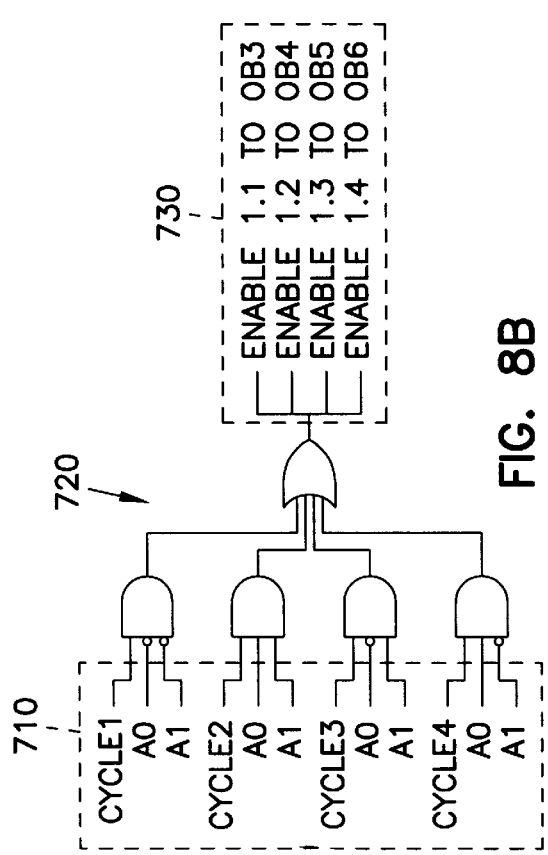
Figure 8E:
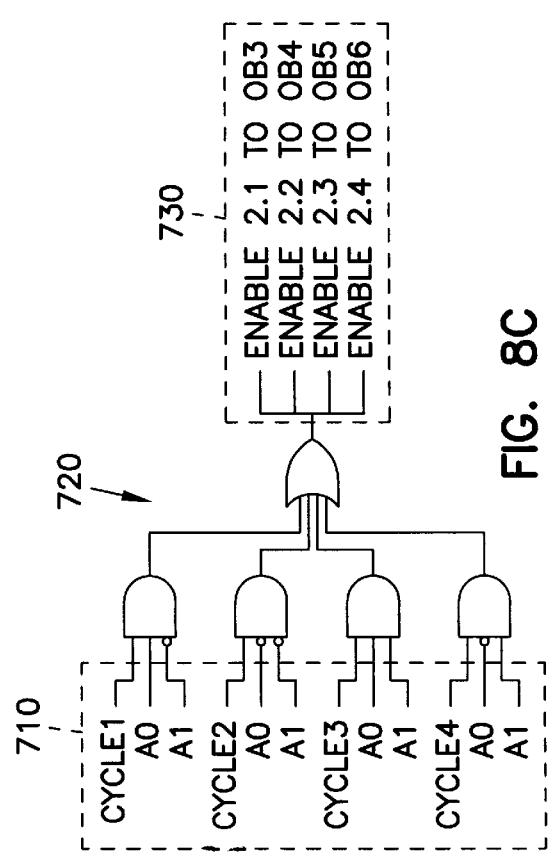
Figure 9D:
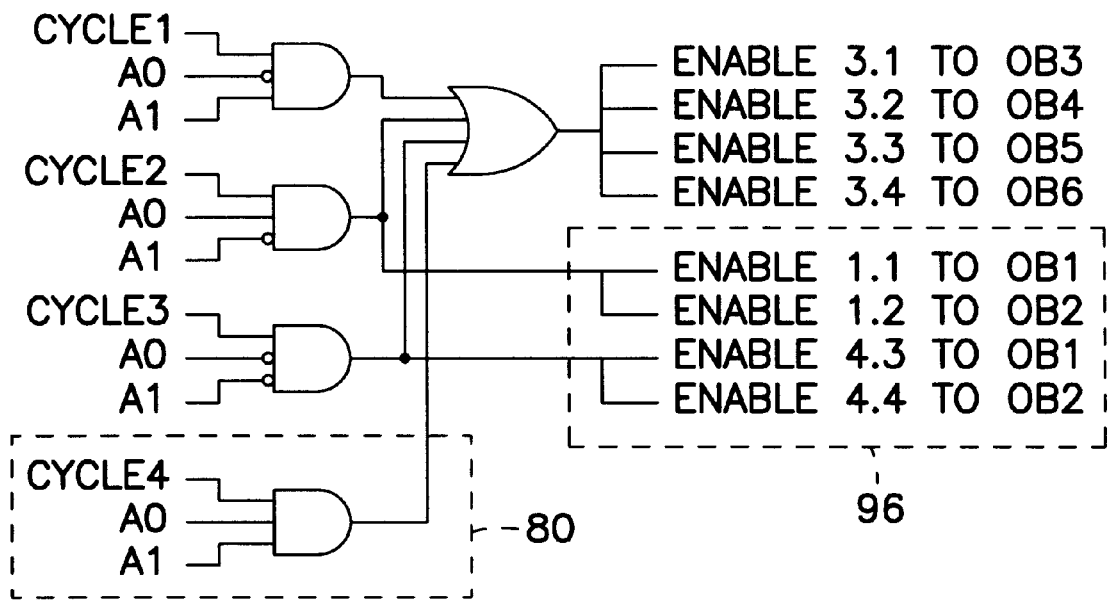
Figure 9E:
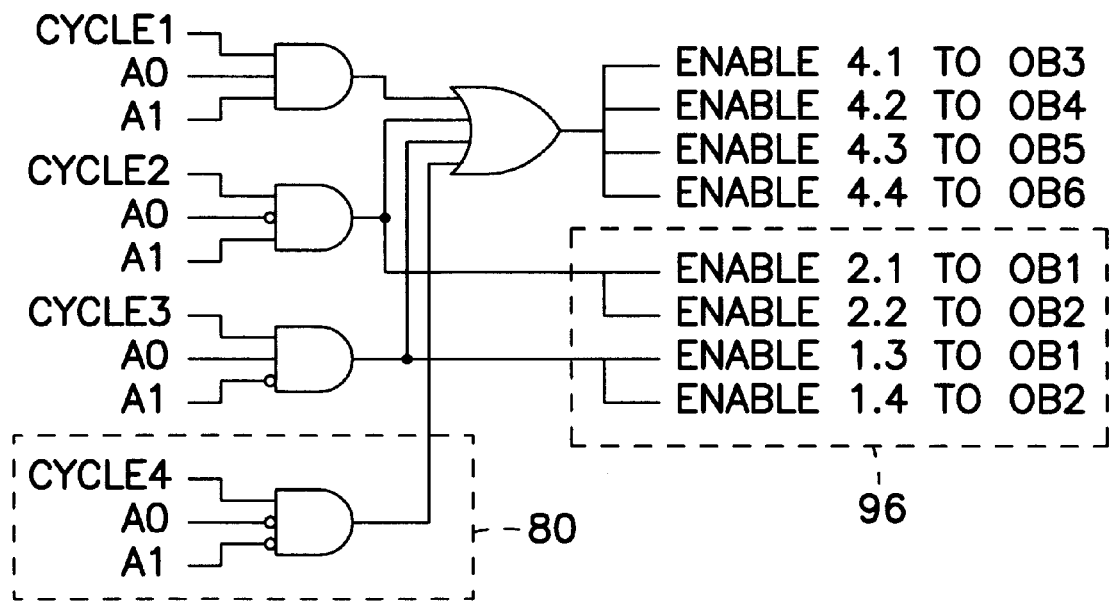

FIG. 6 is a block diagram of available routes for data to be transferred from the memory array to the output blocks for the case of an 80-bit implementation. In this embodiment, longwords A, B, C and D are arranged in the same structure in the portion of memory array 510 as in FIG. 3 for the case of 96-bit implementation however, up to four tag words indicated as tag.1, tag.2, tag.3 and tag.4 can be utilized. The output blocks 530 in this embodiment comprises five 16-bit output block 531, 533, 534, 535 and 536 which are indicated respectively as OB1, OB3, OB4, OB5 and OB6. Data are transferred from the memory array 510 to output blocks 530 by a logic selection from a plurality of pathways 520. Pathways 520 comprises up to twenty routes in which five routes 521, 523, 524, 525 and 526 are connected to output blocks 530.

FIGS. 7A–7D are possible output block selection combinations when the initial address is 00, 01, 10, and 11 respectively for the case of an 80-bit implementation. These Figures shows that four bus cycles are needed for data transfer. In this case, tag or useful information appears on every bus cycle (cycle1 through cycle4) therefore it is an efficient utilization of bus. In this 80-bit implementation, to maximize performance, the tag limit is 16 bits. If more tag bits are need, the 80-bits would be expanded within reason to accommodate the additional necessary bits. For example, if a 20-bit tag is essential, this would entail an 84-bit bus. 11 bits of ECC is sufficient regardless of tag size, within reason. The logic which enables these possible output block selection combinations is described in FIGS. 8A–8E.

FIGS. 8A–8E are the combinations of the logic for the case of an 80-bit implementation. For this 80-bit case, four bus cycles are needed and the order of data transaction is cycle1, then cycle2, then cycle3, and finally cycle4. In this embodiment, the logic comprises a combination of input 710, logic gates 720 and a plurality of outputs 730. Logic gates 720 comprises logic a plurality of logic AND and logic OR gates. Input 710 driving the logic comprises cycle1, cycle2, cycle3, cycle4, A0 and A1. A0 and A1 represent the two least significant bits of the initial address. Cycle1, cycle2 or cycle3 is the current bus cycle determined by bus cycle counter 102. Outputs 730 from this logic enables the data to be transferred to the appropriate blocks of output blocks 530. Detailed combinations of the logic enabling at output 730 are described in Table 2. In this table, OB represents output block, IA represents the least two significant bits of the initial address, tag.1 and tag.2 represent the miscellaneous additional information such as status, ECC, tag, etc. and 1.1 represents datum 1: word 1 in the current cache line, 1.2 represents datum 1; word 2, etc.

TABLE 2

Logic for an 80-bit Linear Burst Data Ordering Implementation

Enable tag.1 to OB1 = Cycle1
Enable tag.2 to OB1 = Cycle2
Enable tag.3 to OB1 = Cycle3
Enable tag.4 to OB1 = Cycle4
Enable 1.1 to OB3 = Cycle1 AND (IA=00) OR Cycle2 AND (IA=11) OR
                    Cycle3 AND (IA=10) OR Cycle4 AND (IA=01)
Enable 1.2 to OB4 = Cycle1 AND (IA=00) OR Cycle2 AND (IA=11) OR
                    Cycle3 AND (IA=10) OR Cycle4 AND (IA=01)
Enable 1.3 to OB5 = Cycle1 AND (IA=00) OR Cycle2 AND (IA=11) OR
                    Cycle3 AND (IA=10) OR Cycle4 AND (IA=01)
Enable 1.4 to OB6 = Cycle1 AND (IA=00) OR Cycle2 AND (IA=11) OR
                    Cycle3 AND (IA=10) OR Cycle4 AND (IA=01)
Enable 2.1 to OB3 = Cycle1 AND (IA=01) OR Cycle2 AND (IA=00) OR
                    Cycle3 AND (IA=11) OR Cycle4 AND (IA=10)
Enable 2.2 to OB4 = Cycle1 AND (IA=01) OR Cycle2 AND (IA=00) OR
                    Cycle3 AND (IA=11) OR Cycle4 AND (IA=10)
Enable 2.3 to OB5 = Cycle1 AND (IA=01) OR Cycle2 AND (IA=00) OR
                    Cycle3 AND (IA=11) OR Cycle4 AND (IA=10)
Enable 2.4 to OB6 = Cycle1 AND (IA=01) OR Cycle2 AND (IA=00) OR
                    Cycle3 AND (IA=11) OR Cycle4 AND (IA=10)
Enable 3.1 to OB3 = Cycle1 AND (IA=10) OR Cycle2 AND (IA=01) OR
                    Cycle3 AND (IA=00) OR Cycle4 AND (IA=11)
Enable 3.2 to OB4 = Cycle1 AND (IA=10) OR Cycle2 AND (IA=01) OR
                    Cycle3 AND (1A=00) OR Cycle4 AND (IA=11)
Enable 3.3 to OB5 = Cycle1 AND (IA=10) OR Cycle2 AND (IA=01) OR
                    Cycle3 AND (IA=00) OR Cycle4 AND (IA=11)
Enable 3.4 to OB6 = Cycle1 AND (IA=10) OR Cycle2 AND (IA=01) OR
                    Cycle3 AND (IA=00) OR Cycle4 AND (IA=11)
Enable 4.1 to OB3 = Cycle1 AND (IA=11) OR Cycle2 AND (IA=10) OR
                    Cycle3 AND (IA=01) OR Cycle4 AND (IA=00)
Enable 4.2 to OB4 = Cycle1 AND (IA=11) OR Cycle2 AND (IA=10) OR
                    Cycle3 AND (IA=01) OR Cycle4 AND (IA=00)
Enable 4.3 to OB5 = Cycle1 AND (IA=11) OR Cycle2 AND (IA=10) OR
                    Cycle3 AND (IA=01) OR Cycle4 AND (IA=00)
Enable 4.4 to OB6 = Cycle1 AND (IA=11) OR Cycle2 AND (IA=10) OR
                    Cycle3 AND (IA=01) OR Cycle4 AND (IA=00)

Those skilled in the art will readily recognize that the implementation for a 80-bit wide device described above could also be used to implement an 80-bit bus wide in a memory device using more than one device. For example, if the 80-bit bus is split across two devices, OB1 would have to be split into two 8-bit halves so that two such identical devices would comprise the 80-bit bus device. As such only one device type is needed, and that device is used twice. The same principle applied in a four device implementation. In this case, the tag and OB1 is split evenly among four devices.

From the illustrations and descriptions of FIG. 3 through FIG. 8E, it is apparent that there are commonality in the available pathways and in the logic selections between the 80-bit and 96 bit implementations. Further examining of FIG. 3 (available routes for a 96-bit implementation) and FIG. 6 (available routes for an 80-bit implementation), a conclusion can be drawn that FIG. 6 is a subset of FIG. 3. Further examining of FIGS. 5A–5E (logic for a 96-bit implementation) and FIGS. 8A–8E (logic for an 80-bit implementation) and also Table 1 and Table 2, a modification could be made to the logic so that it can implement both 80-bit and 96-bit implementation from the same memory array. Thus the block diagram of the routes in FIG. 3 can be used for both cases of an 80-bit and 96-bit implementation, and the modified logic to implement both cases is illustrated in FIGS. 9A–9E.

FIGS. 9A–9E are the combinations of the logic for both cases of an 80-bit and a 96-bit implementation according to the present invention. This embodiment shows the logical differences between the 80-bit and the 96-bit implementation and identifies the logic that is common and specific to each implementation. In FIGS. 9A–9E, the common logic in each Figure is the entire logic excluding optional logic indicated at 96 and optional logic indicated at 80. The common logic and optional logic 96 are active only in the case of a 96-bit implementation. The common logic and optional logic 80 are active only in the case of an 80-bit implementation.

From the detailed description of the invention, an 80-bit implementation is carried out by four bus cycles and useful information is on every cycle therefore the bus utilization is more efficient. A 96-bit implementation requires only three instead of four cycles thus speeding up the data transaction process. The block selections described in these embodiments are in terms of output but it is also understood that the input ordering is identical and follows the same logic. Furthermore it is clear that implementation of an 80-bit and a 96-bit device using the same memory array can be obtained by the logic described in the present invention.

What is claimed is:

1. A computer system comprising:
   a processor;
   a cache memory having a plurality of cache lines and tag lines; and
   a processor-cache interface wherein the processor-cache interface including an N-bit data bus, wherein the N-bit data bus is configurable as a 96-bit wide data bus, and wherein when the N-bit bus is configured as a 96-bit wide data bus a data transaction between the processor and the cache memory is completed in three bus cycles.

2. The computer system according to claim 1 wherein the cache memory includes a bus cycle counter and selection logic for selecting between a plurality of cycle times for completing the data transaction between the processor and the cache memory.

3. The computer system according to claim 2 wherein the cache lines comprise a plurality of longwords, the tag lines comprise a plurality of tag words, wherein each longword comprises a plurality of words which together with the tag words are merged into an ordered block of information by an ordering scheme to allow the optimal use of the N-bit bus.

4. The computer system according to claim 3 wherein the cache memory further comprises a plurality of data routing pathways which enables the words and tag words to be merged into the ordered block.

5. The computer system according to claim 5 wherein the cache memory further comprises an input selection logic and an output selection logic, which provide logical control to the routing of data on the data routing pathways such that the words and tag words are properly transferred to the ordered block according to the data ordering scheme.

6. The computer system according to claim 5 wherein the input selection logic and the output selection logic are logically the same.

7. The computer system according to claim 1 wherein the cache lines comprise a plurality of longwords, the tag lines comprise a plurality of tag words, wherein each of the longwords comprises a plurality of words which together with the tag words are merged into an ordered block of information by an ordering scheme to allow the optimal use of the N-bit bus.

8. The computer system according to claim 7 wherein the cache memory further comprises a plurality of data routing pathways which enables the words and tag words to be merged into the ordered block.

9. The computer system according to claim 8 wherein the cache memory further comprises an input selection logic and an output selection logic, which provide logical control to the routing of data on the data routing pathways such that the words and tag words are properly transferred to the ordered block according to the ordering scheme.

10. The computer system according to claim 9 wherein the input selection logic and the output selection logic are logically the same.

11. A cache memory, comprising:
    a memory array having a plurality of tag words, and a plurality of longwords including first, second, third and fourth longwords, wherein each longword comprises a plurality of words;
    a plurality of output blocks connected to the memory array for holding data;
    a plurality of data routing pathways comprising thirty-four pathways connected to the output blocks for data transfer between the memory array and the output blocks;
    a cache interface having an N-bit wide data bus connected to the output blocks;
    an input select logic having a plurality of common logics, and a plurality of optional logics including first and second optional logics, and a plurality of inputs and outputs;
    an output select logic having a plurality of common logics, and a plurality of optional logics including first and second optional logics, and a plurality of inputs and outputs;
    a bus cycle counter producing a plurality of sequential count cycles to keep track of the count cycles of the N-bit wide data bus.

12. The cache memory according to claim 11 wherein the input select logic and the output select logic are logically the same.

13. The cache memory according to claim 12 wherein the input and the output select logic operate in a way such that the common logics are always operative, the first optional logics are operative only when N is 80, and the second optional logics are operative only when N is 96.

14. The cache memory according to claim 13 wherein the inputs and the outputs of the input and output select logic comprise sequential count cycles of the cycle counter and two least significant digits of an initial address of the longwords.

15. The cache memory according to claim 14 wherein the bus cycle counter resets to zero after counting the first, the second and the third count cycle when the N-bit data bus is a 96-bit wide data bus, and the cycle counter resets to zero after counting the first, the second, the third and the fourth count cycle when the N-bit data bus is a 80-bit wide data bus.

16. The cache memory according to claim 15 wherein all the tag words associated with the first, second, third, and fourth longwords are transferred on the first bus cycle when the N-bit data bus is a 96-bit wide data bus, and the tag words associated with the first, second, third, and fourth longwords are present in every bus cycle when the N-bit data bus is an 80-bit wide data bus.

17. The cache memory according to claim 16 wherein the input and output select logic enable up to six of the thirty-four data routing pathways to transfer data from the memory array to the associated output blocks.

18. The cache memory according to claim 17 wherein the input select logic and the output select logic is configured the same.

19. A method of operating a cache memory in a computer system having a processor, comprising the steps of:
configuring a processor-cache interface wherein the processor-cache interface includes an N-bit data bus;
configuring a cache memory to have a plurality of longwords;
receiving a cache line request;
determining from the cache line request a critical order for transferring cache line data;
retrieving the longwords in the order according to the critical order wherein the retrieving of the longwords is achieved in three bus cycles when the N-bit data bus is configured as a 96-bit wide data bus;
logically selecting the data in the order according to the critical order; and
outputting the data in the order according to the critical order.

20. The method of claim 19 wherein the step of retrieving the longwords is achieved in four bus cycles when the N-data bus is configured as a 80-bit wide bus.

21. A computer system comprising:
a processor;
a cache memory having a plurality of cache lines and tag lines and word selection logic, wherein the word selection logic implements a plurality of bus widths, wherein the word selection logic implements a data bus having a width equal to 96 bits, and wherein data transactions between the processor and the cache memory are completed in three bus cycles when the data bus has a width equal to 96 bits; and
a processor-cache interface for transferring data between the processor and the cache memory.

22. The computer system according to claim 21 wherein the word selection logic implements a data bus having a width equal to 80 bits, and wherein data transactions between the processor and the cache memory are completed in four bus cycles.

23. A method of operating a cache memory in a computer system having a processor, comprising the steps of:
providing a processor-cache interface wherein the processor-cache interface includes word selection logic for selecting between a plurality of bus data widths;
selecting a bus data width from the plurality of bus data widths;
receiving a cache line request;
determining from the cache line request a critical order for transferring cache line data;
retrieving the cache line data in the critical order;
formatting the data in the selected bus data width; and
transferring the data to the processor in the critical order wherein the transfer of data is completed in three bus cycles when the width of the data bus equals 96-bits.

24. The method of claim 23 wherein the step of determining a critical order includes the step of examining the initial address.

* * * * *